United States Patent
Nakano et al.

(10) Patent No.: US 9,410,021 B2
(45) Date of Patent: Aug. 9, 2016

(54) METHOD FOR PRODUCING SURFACE-MODIFIED FLUORORESIN FILM/THERMOPLASTIC RESIN COMPOSITE

(75) Inventors: Hiroaki Nakano, Kobe (JP); Eiji Yao, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 383 days.

(21) Appl. No.: 13/616,229

(22) Filed: Sep. 14, 2012

(65) Prior Publication Data
US 2013/0168393 A1 Jul. 4, 2013

(30) Foreign Application Priority Data

Dec. 28, 2011 (JP) ................................ 2011-289525

(51) Int. Cl.
| | | |
|---|---|---|
| *B05D 3/00* | (2006.01) | |
| *B05D 3/06* | (2006.01) | |
| *C08J 7/18* | (2006.01) | |
| *C08J 5/12* | (2006.01) | |
| *B32B 27/16* | (2006.01) | |
| *C08J 7/12* | (2006.01) | |
| *B29C 59/14* | (2006.01) | |
| *B32B 27/30* | (2006.01) | |
| *B32B 27/32* | (2006.01) | |
| *B29K 27/12* | (2006.01) | |
| *B29K 27/18* | (2006.01) | |

(52) U.S. Cl.
CPC ................. *C08J 5/121* (2013.01); *B29C 59/14* (2013.01); *B32B 27/16* (2013.01); *B32B 27/304* (2013.01); *B32B 27/322* (2013.01); *C08J 7/123* (2013.01); *B29K 2027/12* (2013.01); *B29K 2027/18* (2013.01); *B29K 2995/0092* (2013.01); *B32B 2250/246* (2013.01); *B32B 2310/0881* (2013.01); *C08J 2327/12* (2013.01); *C08J 2327/18* (2013.01); *C08J 2423/02* (2013.01); *Y10T 428/3154* (2015.04)

(58) Field of Classification Search
CPC ............ B32B 27/16; B08J 5/12; B29C 59/14; B29C 66/0224; B29C 65/02; B29C 65/42
See application file for complete search history.

(56) References Cited

U.S. PATENT DOCUMENTS

| | | | | |
|---|---|---|---|---|
| 4,370,187 A | * | 1/1983 | Katagiri et al. | 156/244.23 |
| 7,622,721 B2 | * | 11/2009 | Gutkin et al. | 250/423 R |
| 2010/0170632 A1 | * | 7/2010 | Gautriaud et al. | 156/244.17 |
| 2010/0264139 A1 | | 10/2010 | Kawachi | |

FOREIGN PATENT DOCUMENTS

| | | |
|---|---|---|
| JP | 3-243330 A | 10/1991 |
| JP | 5-116254 A | 5/1993 |

(Continued)

*Primary Examiner* — Michael Wieczorek
(74) *Attorney, Agent, or Firm* — Birch, Stewart, Kolasch & Birch, LLP

(57) ABSTRACT

The present invention aims at providing a composite of a surface-modified fluororesin film and a thermoplastic resin bonded to each other, and medical equipment containing the composite. A method for producing a fluororesin/thermoplastic resin composite includes roughening a surface of a fluororesin film by ion beam irradiation from an ion source, and pressure-bonding the surface-modified fluororesin film obtained in the surface roughening step and a thermoplastic resin while maintaining the thermoplastic resin in a fluid state.

4 Claims, 6 Drawing Sheets

(56) References Cited

FOREIGN PATENT DOCUMENTS

| JP | 2009-263529 A | 11/2009 |
| JP | 2013-1002 A | 1/2013 |
| WO | WO 2009/082034 A1 | 7/2009 |

* cited by examiner

METHOD FOR PRODUCING SURFACE-MODIFIED FLUORORESIN FILM/THERMOPLASTIC RESIN COMPOSITE

TECHNICAL FIELD

The present invention relates to a composite of a surface-modified fluororesin film and a thermoplastic resin bonded to each other, and medical equipment containing the composite.

BACKGROUND ART

Fluororesins are excellent in chemical stability and thermal stability, and have self-lubricating properties which are responsible for advantageous characteristics such as low friction coefficients. Despite their excellent properties, the fluororesins are used in limited applications because of their much higher prices than those of common resins.

Additionally, their chemical stability makes it difficult to produce a laminate of a fluororesin sheet or film bonded to another material with an adhesive so as to reduce the amount of fluororesin to be used. Therefore, the use of fluororesins has not been spread to, for example, closures (or plugs, or caps) for drug containers to which their chemical stability is advantageous.

In this context, Patent Literature 1 discloses a technique to improve the hydrophilicity of the surface of a fluororesin molding. Specifically, the surface of a fluororesin molding is roughened by plasma irradiation, and fluorine atoms on the surface of the molding are replaced by implanted plasma ions in order that the fluororesin can be bonded to another material with an adhesive.

However, such a method as disclosed in Patent Literature 1 which hydrophilizes the surface by replacing inactive atoms on the surface with other atoms by plasma treatment is known to have a problem with durability of the surface modification effect (hydrophilicity) which is caused by factors such as hiding of functional groups on the treated surface (modified surface) inside the resin due to thermal fluctuations of the polymer, and dissociation of low-molecular weight hydrophilic moieties formed on the surface.

As the surface modification effect decreases over time, the usable lifetime (shelf life) of fluororesin-based products which are surface-modified by the method of Patent Literature 1 is limited to a short period. If, because of poor demand forecast, the production in a subsequent process in which a fluororesin-based product prepared in the previous step is used as a material turns out lower than the forecast, a stock of fluororesin-based products may then become faulty products (defective products).

CITATION LIST

Patent Literature

Patent Literature 1: JP-A 2009-263529

SUMMARY OF INVENTION

Technical Problem

In view of the above problems, an object of the present invention is to provide a composite of a surface-modified fluororesin film and a thermoplastic resin bonded to each other, and medical equipment containing the composite.

Further intensive studies by the present inventors have revealed that a fluororesin film surface-modified by the same method as disclosed in the patent literature and a thermoplastic resin are successfully bonded to each other by pressure-bonding them while maintaining the thermoplastic resin in a molten state. Thus, the present invention has been completed.

Specifically, the present invention relates to a method for producing a fluororesin/thermoplastic resin composite, which includes roughening a surface of a fluororesin film by ion beam irradiation from an ion source; and pressure-bonding the surface-modified fluororesin film obtained in the surface roughening step and a thermoplastic resin while maintaining the thermoplastic resin in a fluid state.

Preferably, the ion source is an anode layer ion source.

Preferably, a voltage of not less than 1.5 kV but not more than 3.5 kV is applied to the anode layer ion source.

Preferably, the fluororesin film includes a fluororesin selected from polytetrafluoroethylene, modified polytetrafluoroethylene, tetrafluoroethylene-perfluoroalkyl vinyl ether copolymers, and ethylene-tetrafluoroethylene copolymers.

Preferably, the pressure-bonding is performed at a temperature of not lower than a melting point of the thermoplastic resin.

Preferably, the pressure-bonding is performed at a temperature of not lower than a molding temperature of the thermoplastic resin.

Preferably, the pressure-bonding is performed under a pressure of not less than 1 MPa.

The present invention also relates to a fluororesin/thermoplastic resin composite obtained by the above production method, and a medical rubber closure produced from the fluororesin/thermoplastic resin composite.

Advantageous Effects of Invention

According to the present invention, a surface-modified fluororesin film obtained by surface roughening and a thermoplastic resin are pressure-bonded while maintaining the thermoplastic resin in a fluid state, thereby providing a composite of the surface-modified fluororesin film and the thermoplastic resin which are sufficiently bonded to each other. The present invention also provides medical equipment containing the composite.

DESCRIPTION OF EMBODIMENTS

The method for producing a fluororesin/thermoplastic resin composite of the present invention includes roughening a surface of a fluororesin film by ion beam irradiation from an ion source, and pressure-bonding the surface-modified fluororesin film obtained in the surface roughening step and a thermoplastic resin while maintaining the thermoplastic resin in a fluid state.

In the surface roughening step, the surface of the fluororesin film is roughened by ion beam irradiation. Known systems can be used as the ion source, but the ion source is preferably an anode layer ion source because of its wide irradiation range.

Figure 1:
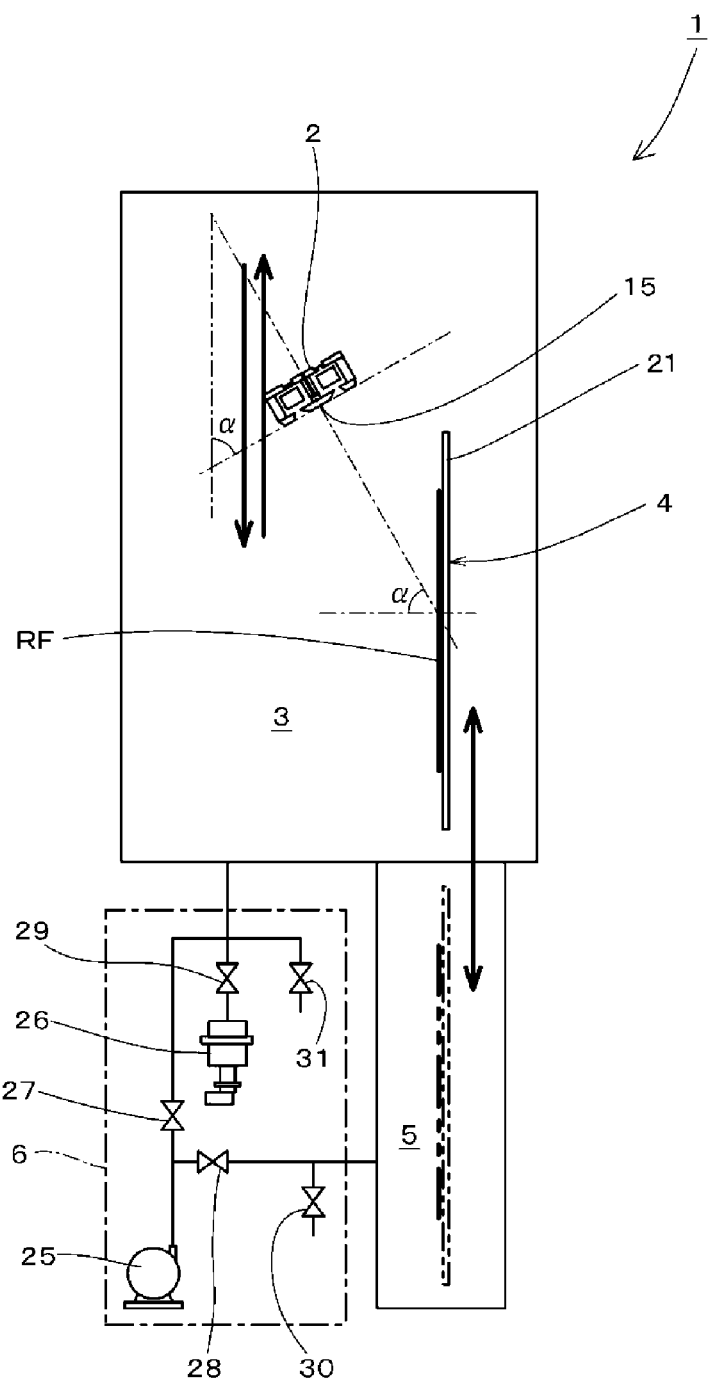
FIG. 1 is a schematic view of a surface modification apparatus.
Figure 2:
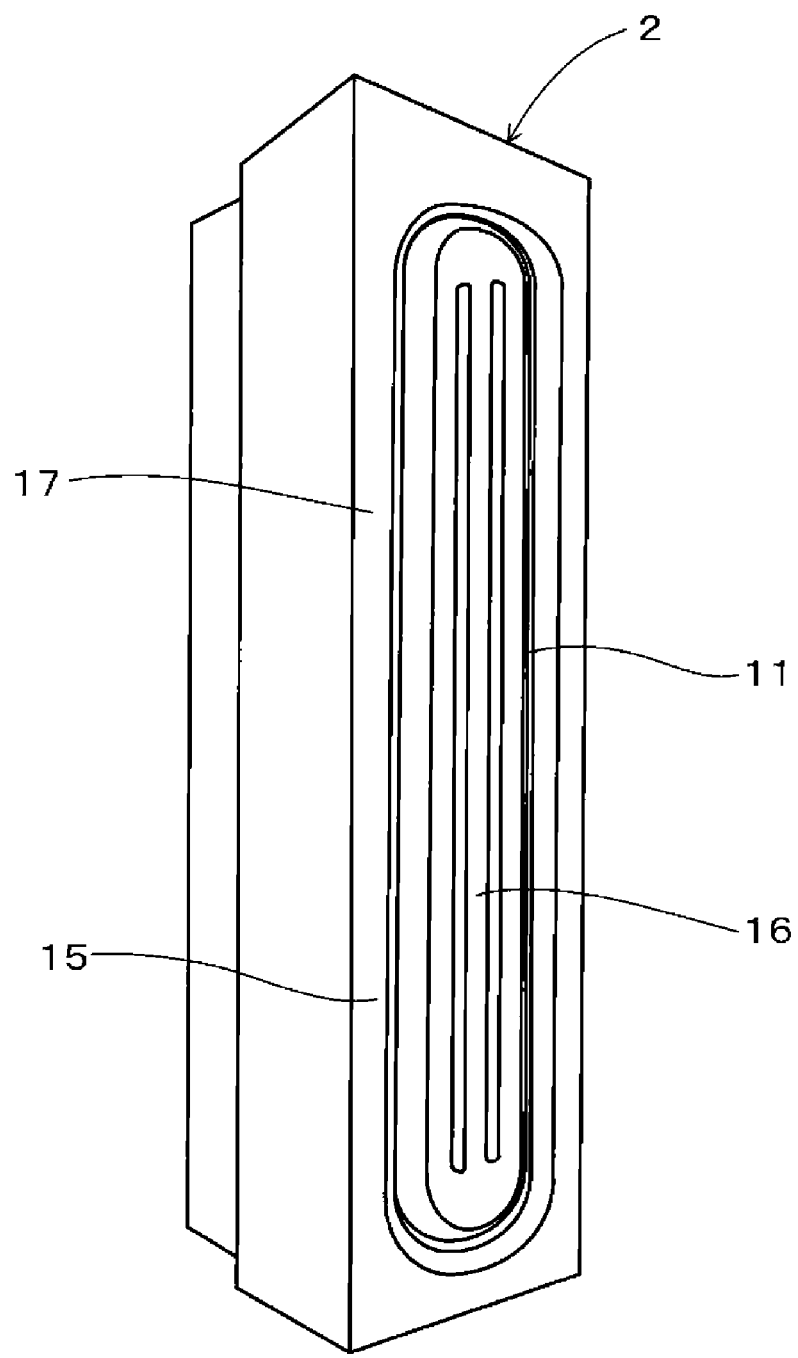
FIG. 2 is a view showing the external appearance of an ion irradiation device.
Figure 3:
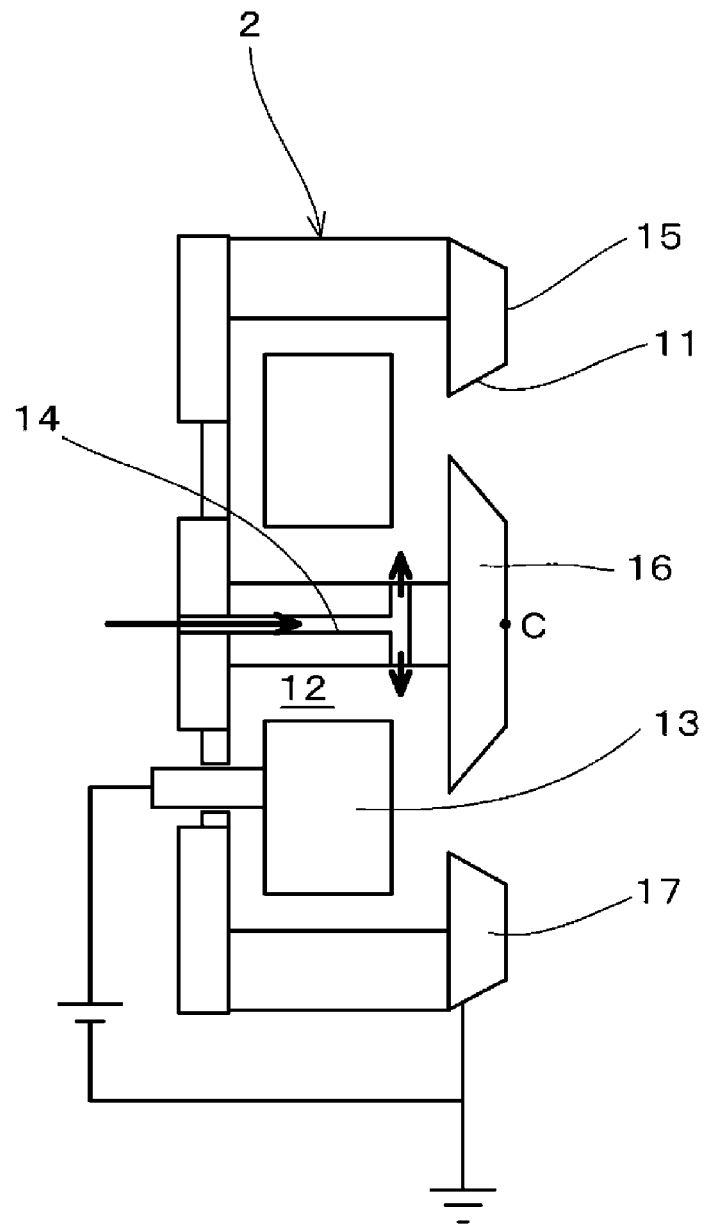
FIG. 3 is a cross-sectional view of the ion irradiation device perpendicular to the longitudinal direction of the ion irradiation device.

FIG. 1 is a schematic view of a surface modification apparatus 1, FIG. 2 is a view of the external appearance of an ion irradiation device 2, and FIG. 3 is a cross-sectional view of the ion irradiation device 2 perpendicular to the longitudinal direction of the ion irradiation device. The surface modification apparatus 1 is used to modify the surface of a fluororesin film RF which is to be incorporated in a thermoplastic resin composite. The surface modification apparatus 1 is provided with a treatment chamber 3, the ion irradiation device 2, an ion irradiator transporting device, a holding device 4, an antechamber 5, and a vacuum device 6.

The treatment chamber 3 is a sealable chamber accommodating the ion irradiation device 2, the ion irradiator transporting device, and the holding device 4. The ion irradiation device 2 has a shape of a slender rectangular parallelepiped as a whole, and is provided with a slit 11, a space 12, an anode 13, and a gas flow path 14. The ion irradiation device 2 is an anode layer ion source that has been modified from an anode layer Hall thruster.

The slit 11 is a loop-shaped aperture through a slender face 15 (hereinafter, referred to as "irradiation lateral face 15") of the ion irradiation device 2 and constituted by arcs at the short sides and lines along the long sides. A portion of the irradiation lateral face 15 which is enclosed by the slit 11 is referred to as an inner pole 16, and a portion of the irradiation lateral face 15 which is outside the slit 11 is referred to as an outer pole 17. In the ion irradiation device 2, at least the irradiation lateral face 15 is made of a ferromagnetic material, and the inner pole 16 and the outer pole 17 are polarized "S" and "N", respectively, by permanent magnets provided in the ion irradiation device 2.

The space 12 is a loop-shaped cavity in the inside of the ion irradiation device 2 and open to the outside through the slit 11. The width of the space 12 is wider than that of the slit 11, and the shape thereof corresponds to the shape of the slit 11. The anode 13 is a loop-shaped electrode accommodated in the loop-shaped space 12. The anode 13 is made of copper or a copper alloy.

The gas flow path 14 serves as a path for introducing gas to be ionized, from the outside of the ion irradiation device 2 into the space 12. In the ion irradiation device 2, the outer pole 17 is grounded and the anode 13 is connected to a direct-current power source. In the ion irradiation device 2, the portion of the irradiation lateral face 15 (also referred to simply as "irradiation lateral face 15") is grounded, and a voltage is applied between the irradiation lateral face 15 and the anode 13. Moreover, since the inner pole 16 and the outer pole 17 in the ion irradiation device 2 are polarized "S" and "N", respectively, a magnetic field substantially perpendicular to the electric field along the axis direction is generated at the opening of the slit 11.

Gas supplied through the gas flow path 14 is ionized into plasma in the loop-shaped space 12 around the slit 11 in the ion irradiation device 2 by electrons moving between the irradiation lateral face 15 and the anode 13. The generated ions move toward the irradiation lateral face 15, and the ions are accelerated by a thin layer (anode layer) between the anode 13 and the slit 11 to be released to the outside through the slit 11.

The ion irradiator transporting device is a device for reciprocally transporting the ion irradiation device 2 in the horizontal direction. The ion irradiator transporting device holds the ion irradiation device 2 in such a manner that the longitudinal direction of the ion irradiation device 2 is kept perpendicular to the horizontal direction (the longitudinal direction coincides with the vertical direction). The ion irradiator transporting device is designed such that the angle α between the irradiation lateral face 15 and the motion direction of the ion irradiation device 2 can be appropriately changed in the range of 0° to 90°. The ion irradiator transporting device can operate with various different transporting conditions (e.g. the speed of the reciprocal motion, the time periods for which the device rests at the end points of the reciprocal motion, the number of reciprocal motions (each motion in one direction (back or forth) is counted as one)). The ion irradiator transporting device may be configured to transport the ion irradiation device 2 in the vertical direction or in a direction different from the horizontal and vertical directions.

The holding device 4 is a device for holding the fluororesin film RF to be modified. The holding device 4 is provided with a thick, strong, rectangular glass substrate 21. The glass substrate 21 is provided in the holding device 4 such that the substrate surface is maintained vertically.

The holding device 4 is movably placed at positions at which the distance between the surface of the glass substrate 21 and the ion irradiation device 2 along a direction perpendicular to the reciprocal motion is constant wherever the reciprocally movable ion irradiation device 2 is. The wording "movably" means that the holding device 4 can move between the treatment chamber 3 and the antechamber 5 as described later.

The antechamber 5 is a sealable chamber that can accommodate the holding device 4. The antechamber 5 is connected to the treatment chamber 3 but is separated from the treatment chamber 3 by a door which is remote controlled to be opened and closed. The holding device 4 can move between the antechamber 5 and the treatment chamber 3, and the motion of the holding device 4 between the antechamber 5 and the treatment chamber 3 is also externally remote controlled along with the opening/closing of the door separating these chambers. The vacuum device 6 consists of a fore vacuum pump 25, a second vacuum pump 26, and a plurality of automatic valves 27, 28, 29, 30, and 31.

The fore vacuum pump 25 is a roughing pump which is operated in a low vacuum stage, and is specifically an oil-sealed rotary pump. The fore vacuum pump 25 is connected to the treatment chamber 3 and the antechamber 5 via the automatic valves 27 and 28, respectively. The second vacuum pump 26 is a vacuum pump which is operated to achieve high vacuum, and is specifically a cryopump. The second vacuum pump 26 is connected to the treatment chamber 3 via the automatic valve 29.

The automatic valves 30 and 31 are a leak valve for releasing the vacuum in the antechamber 5 and a leak valve for releasing the vacuum in the treatment chamber 3, respectively.

Next, surface modification treatment on the fluororesin film RF by the surface modification apparatus 1 is described.

Figure 4:
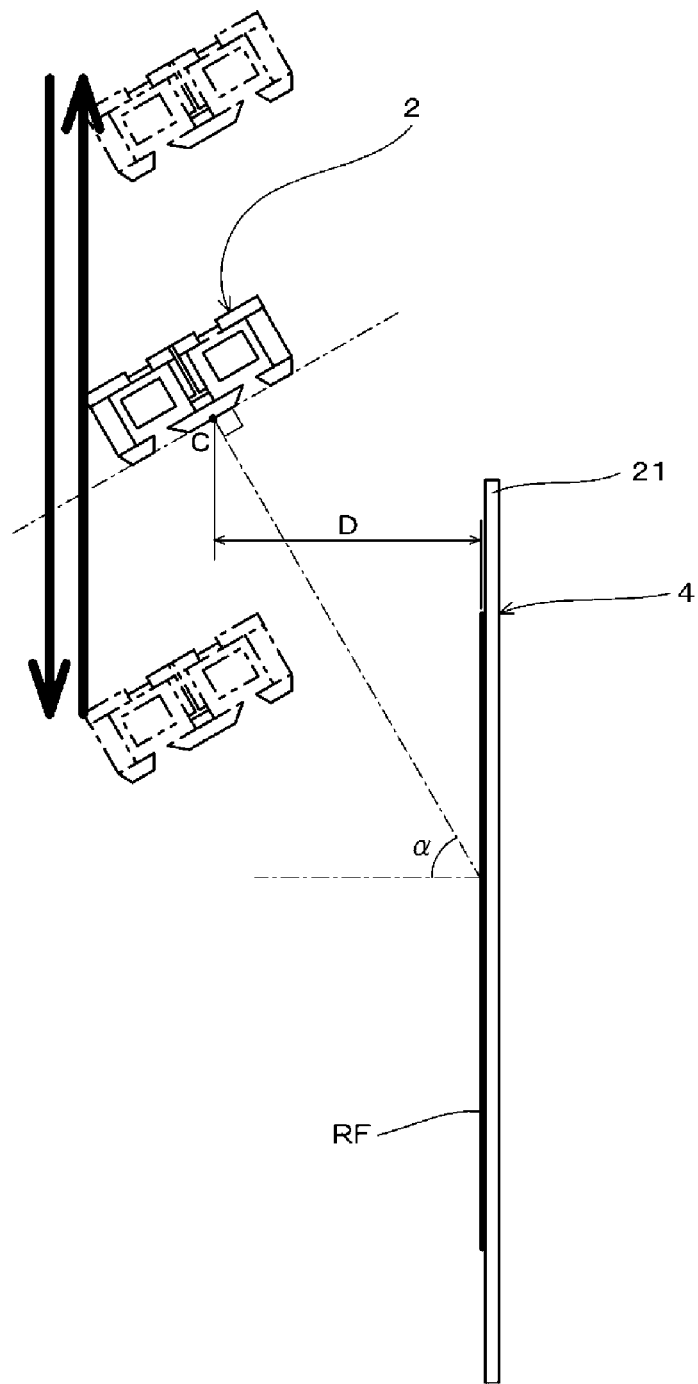
FIG. 4 is a view showing ion beam irradiation from the ion irradiation device.

FIG. 4 is a view showing ion beam irradiation from the ion irradiation device 2. First, the fluororesin film RF to be modified is immobilized on the glass substrate 21 of the holding device 4. The "fluororesin" means a polymer containing fluorine atoms, and examples thereof include polytetrafluoroethylene (PTFE), modified PTFE, tetrafluoroethylene-perfluoroalkyl vinyl ether copolymers (PFA), ethylene-tetrafluoroethylene copolymers (ETFE), and polychlorotrifluoroethylene (PCTFE). The fluororesin may be only one of these polymers or may be a blend of two or more polymers. Particularly, PTFE is preferred among these because it has the lowest friction coefficient and excellent heat resistance. Modified PTFE is also preferred because of its high elongation at break and good moldability.

In the present invention, the shape of the film is not particularly limited and can be appropriately determined according to the shape of a desired molded product. In economic point of view, the film is preferably thinner but the thickness can be appropriately determined based on a consideration of deformation in connection with the particular molding or usage conditions. The film thickness is preferably 10 μm to 150 μm.

The fluororesin film RF is cut into a rectangular shape, and four corners or two opposing sides thereof are directly or indirectly fixed on the glass substrate 21. The fluororesin film RF is subjected to a tension that is low enough not to cause wrinkles.

As shown in FIG. 1, the glass substrate 21 on which the fluororesin film RF is immobilized is integrated with the holding device 4 in the antechamber 5.

The antechamber 5 and the treatment chamber 3 are sealed and isolated from the outside. The door between the antechamber 5 and the treatment chamber 3 is open.

While the automatic valves 27 and 28 are opened and the automatic valves 29, 30, and 31 are closed, the fore vacuum pump 25 of the vacuum device 6 is driven to reduce the pressures in the antechamber 5 and the treatment chamber 3.

When the vacuums in the antechamber 5 and the treatment chamber 3 reach predetermined levels (e.g. $10^2$ Pa), the holding device 4 is transported from the antechamber 5 to the treatment chamber 3, and the door between the antechamber 5 and the treatment chamber 3 is closed.

The transported fluororesin film RF in the treatment chamber 3 is placed at an appropriate position according to the distance from the ion irradiation device 2 and an ion irradiation angle α. Here, the ion irradiation angle α means an angle formed by the direction of ion beam irradiation to the modification target (fluororesin film RF) and the direction perpendicular to the surface to be modified. Regarding the surface modification apparatus 1, the ion irradiation angle α is the same as the angle α formed by the irradiation lateral face 15 and the motion direction of the ion irradiator transporting device.

The fluororesin film RF is immobilized on the glass substrate 21 such that either pair of two opposing sides is along the longitudinal direction of the ion irradiation device 2.

Subsequently, the automatic valves 27 and 28 are closed, the automatic valve 29 is opened, the fore vacuum pump 25 is stopped, and then the second vacuum pump 26 is driven. The pressure in the treatment chamber 3 is reduced to a much higher vacuum of, for example, $10^{-2}$ Pa by the second vacuum pump 26.

The ion irradiation device 2 is mounted on the ion irradiator transporting device such that the angle α between the irradiation lateral face 15 and the motion direction of the ion irradiator transporting device is a predetermined angle. Gas to be ionized is supplied at a predetermined flow rate to the ion irradiation device 2 through the gas flow path 14. The gas to be ionized is preferably argon, oxygen, or nitrogen gas, for example, and only one or two or more of these may be used. Argon gas is particularly preferred among these because it is less likely to generate chemically active functional groups.

When the vacuum in the treatment chamber 3 becomes stable at the predetermined level, the ion irradiation device 2 is driven to emit ion beams to the fluororesin film RF, thus initiating surface modification. At this time, the ion irradiation device 2 is transported at a predetermined speed by the ion irradiator transporting device from one of the motion end points to the other in the horizontal direction.

After a predetermined number of motions of the ion irradiation device 2 from either motion end point to the other, the motion and operation of the ion irradiation device 2 are stopped, thus completing the surface modification. The surface modification herein is performed to roughen the surface by destructing the surface and internal molecular structures of and around the surface of the fluororesin film RF by emitted ion beams.

The average energy of ions emitted is preferably not less than 0.5 keV but not more than 1.8 keV, and more preferably not less than 1.2 keV but not more than 1.8 keV. If the average energy is less than 0.5 keV, the ion beam irradiation may produce too small an effect to provide a desired composite. An average energy of more than 1.8 keV may cause deformation or discoloration of the film and therefore may reduce the product value of the resulting composite. The above anode layer ion source is known to provide an average energy of about half of the value of a voltage applied thereto, and therefore the voltage to be applied to the anode layer ion source is preferably not less than 1.0 kV but not more than 3.5 kV, more preferably not less than 1.5 kV but not more than 3.5 kV, and still more preferably not less than 2.5 kV but not more than 3.5 kV.

As ions to be emitted, inert gas is preferably used because it can minimize changes in the composition of the fluororesin surface. This is because in the case of emitting active gas, the active gas is likely to chemically react with the fluororesin, resulting in generation of functional groups on the fluororesin surface. Disadvantageously, these active groups generally tend to hide from the surface due to thermal motion and cause changes in adhesion strength over time, although these groups improve the adhesion strength. Examples of inert gas include argon and nitrogen.

In the present invention, the thermoplastic resin is not particularly limited and known thermoplastic resins may be used. A single thermoplastic resin may be used or a composite of two or more thermoplastic resins may be used. Alternatively, it may be a thermoplastic resin (dynamically vulcanized thermoplastic elastomer, TPE-V) including fine cross-linked rubber phases in the thermoplastic resin.

Examples of the thermoplastic resins include olefin resins, styrene resins, and thermoplastic urethane resins. Examples of olefin resins include polypropylene resins, polyethylene resins, and cycloolefin resins. Examples of styrene resins include polystyrene resins, styrene-butadiene block copolymers, styrene-isoprene block copolymers, and hydrogenated block copolymers thereof. Examples of the composites mentioned above include olefin elastomers (TPO) which include an olefin resin and uncross-linked rubber phases of an ethylene-propylene polymer and TPE-V which includes an olefin resin and cross-linked rubber phases of an ethylene propylene diene polymer.

The present invention is characterized by pressure-bonding a surface-treated film and a thermoplastic resin in a molten state to provide strong adhesion therebetween. Specifically, the present invention is characterized in that the thermoplastic resin in a molten state is stuck in irregularities on the fluororesin surface roughened by the surface treatment, to provide strong adhesion by so-called anchorage.

In the present invention, the "molten state" means that the thermoplastic resin has sufficient fluidity for molding, and can be achieved by maintaining the temperature at an ordinary molding temperature or higher. In the case that the thermoplastic resin has a melting point, it can be turned into the molten state at a temperature of not lower than the melting point of its main component. In the case that the thermoplastic resin does not have a clear melting point, for example, temperatures required for injection molding or extrusion molding may be adequate, and the molten state can be achieved at a temperature of not lower than a molding temperature taught in a catalog or the like of the particular thermoplastic resin.

The melting point of the thermoplastic resin means a melting peak temperature measured by differential scanning calorimetry (DSC) in accordance with JIS K 7121-1987. In the case that the thermoplastic resin is a single resin species, the pressure-bonding is performed at a temperature of not lower than the determined single melting peak temperature. In the case that the thermoplastic resin is a composite, the pressure-bonding may be performed at a temperature of not lower than the highest melting peak temperature among the melting peak temperatures of all components. In the case that the thermoplastic resin composite turns into the molten state at a temperature of not lower than the melting peak temperature of the main component, the pressure-bonding may be performed at this temperature. In the case that the thermoplastic resin composite has a so-called sea-island structure, the pressure-bonding may be performed at a temperature of not lower than the melting peak temperature of the thermoplastic sea phase. For example, in the case of a dynamically vulcanized thermoplastic elastomer (TPE-V) which includes a sea phase of a thermoplastic resin and island phases of a cross-linked rubber, the pressure-bonding may be performed at a temperature of not lower than the melting peak temperature of the thermoplastic resin forming the sea phase.

The thermoplastic resin may be mixed with any additives, provided that the fluidity of the resin is not impaired. Examples of such additives include plasticizers, antioxidants, and fillers.

The pressure required for bonding should be high enough to allow the fluororesin film to be in sufficient contact with the thermoplastic resin, and is not particularly defined herein. In the case of a heat press machine described later, the pressure is preferably 1 MPa or higher to remove the air between the thermoplastic resin and the fluororesin film and bring them in contact. In general, the pressure during molding should be determined based on the shape of a mold, the shape of a desired molded product, and the fluidity of the resin. In the case of press molding, the pressure is preferably 1 to 10 MPa; in the case of injection molding, the pressure is preferably about 10 to 50 MPa.

The method for pressure-bonding at a temperature of not lower than a melting temperature may be selected from known production methods. For example, a heat press machine, an injection molding machine, a transfer molding machine, or the like may be used. Particularly, a heat press machine is preferred because the temperature and pressure are easily controlled. An injection molding machine is also preferred because the thermoplastic resin is easily plasticized. A machine equipped with a cooling device is preferably used in order to immediately take out a molded product obtained by heating the thermoplastic resin to a temperature of not lower than the melting point, and then pressure-bonding the thermoplastic resin and the fluororesin film. Additionally, this step is preferably performed under reduced pressure in order to ensure the contact between the thermoplastic resin and the fluororesin film.

From an industrial point of view, it is preferable to perform the bonding between the thermoplastic resin and the fluororesin film according to the present invention, simultaneously with molding. The bonding and molding can be simultaneously performed, for example, by setting a mold of a desired shape in the heat press machine, introducing the thermoplastic resin and the fluororesin film in the mold, melting the thermoplastic resin by heating, and then applying a predetermined pressure to bond the molten thermoplastic resin and the fluororesin film and simultaneously allow the bonded composite to deform.

The fluororesin/thermoplastic resin composite obtained by the production method of the present invention can be suitably used particularly as a medical rubber product. Examples of such medical rubber products include medical rubber closures (or plugs, or caps) for vials, gaskets for injection syringes (gaskets for syringes, gaskets for pre-filled syringes), and sealing members for medical devices.

Figure 5:
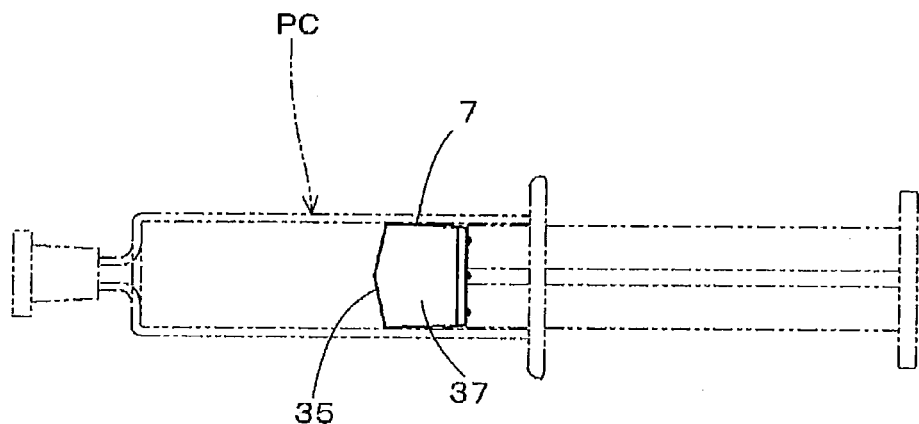
FIG. 5 is a view of a medical rubber product used in a pre-filled syringe.
Figure 6:
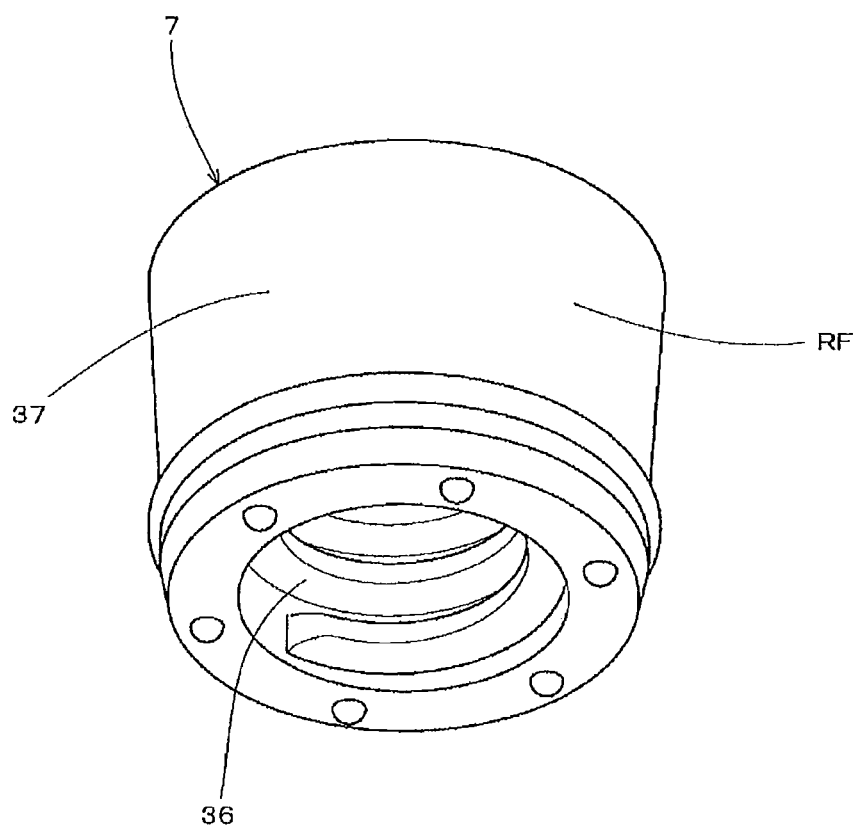
FIG. 6 is a perspective view of the medical rubber product.
Figure 7:
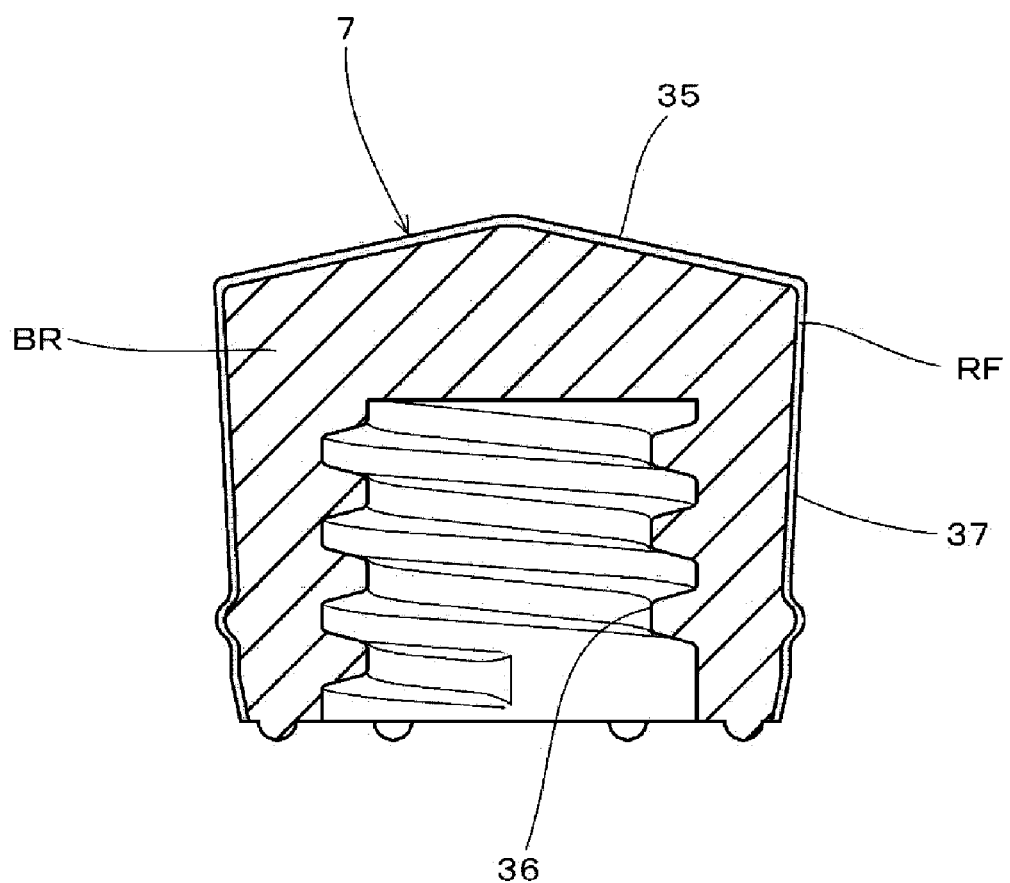
FIG. 7 is a cross-sectional view of the medical rubber product.

FIG. 5 is a view of a medical rubber product used in a pre-filled syringe PC, FIG. 6 is a perspective view of the medical rubber product, and FIG. 7 is a cross-sectional view of the medical rubber product.

The medical rubber product shown in FIGS. 5 to 7 is a piston 7 for compressing and discharging a liquid medicament in the pre-filled syringe PC. As shown in FIGS. 6 and 7, the piston 7 is substantially a cylinder having one end face (bottom) that is an umbrella-shaped pressing surface 35 (like a circumferential surface of a truncated cone having a height much smaller than the diameter of the bottom). A female screw hole 36 extending in the axis direction is formed on the other end face of the piston 7. The piston 7 is produced by vulcanization molding a stack of the thermoplastic resin and the fluororesin film (PTFE film) having a surface roughened by the surface modification apparatus 1. As a result, a large part of the piston 7 is made of the thermoplastic resin, and the fluororesin film RF bonded to the thermoplastic resin is exposed on the pressing surface 35 and a circumferential surface 37.

Since the pressing surface 35 and the circumferential surface 37 are made of the fluororesin film RF, the piston 7 does not alter the liquid medicament in the pre-filled syringe PC and the piston 7 itself is also not altered. Additionally, since the face of the piston 7 which slides on the cylinder is made of the fluororesin having self-lubricating properties, injection of the liquid medicament by the pre-filled syringe PC can be smoothly performed.

The rubber composite of the fluororesin film RF and the thermoplastic resin bonded to each other can be used as other medical rubber products such as closures (or plugs, or caps) for bottles for liquid medicaments, in addition to the piston 7 of the pre-filled syringe PC.

The usage of the rubber composite is not particularly limited to medical purposes, and the rubber composite can be used in various applications which require properties such as the elasticity of the rubber and the self-lubricating properties, chemical resistance, and heat resistance of the fluororesin, for example, as packings for industrial facilities.

In the above embodiment, the shape of the fluororesin is not particularly limited. In the case that the composite is formed into a certain three-dimensional shape at the same time as the vulcanization bonding of the fluororesin to the rubber, the fluororesin may be formed into the target shape in advance, or a thin film may be treated and then molded together with the rubber at the same time as the vulcanization bonding. The latter is preferred in terms of process simplicity. In the latter case, a thinner film is more advantageous in term of moldability, but too thin a film is likely to allow pin holes to occur when the film is, for example, stretched in connection with the deformation. The thickness is preferably 0.044 mm to 0.15 mm, but can be appropriately determined based on the deformation amount.

Moreover, ions in emitted ion beams preferably have an average energy of 0.8 to 2.5 keV. If the energy is low, the treatment disadvantageously takes a long time. If the energy is high, the fluororesin is severely decomposed and gas (generated by decomposition of the resin) disadvantageously reduces the vacuum. The average energy is more preferably 1.2 to 1.8 keV.

In general, anode layer ion sources are known to provide ions having an average energy of about half of the value of a voltage applied thereto. If the target average energy is 0.8 to 2.5 keV, the voltage capable of achieving this energy should be 1.6 to 5.0 kV; if the target average energy is 1.2 to 1.8 keV, the voltage should be 2.4 to 3.6 kV.

The number of ions emitted per unit area of the fluororesin film should be determined so as to provide desired adhesion strength, and is preferably about $10^{13}$ to $10^{18}$ ions/cm$^2$. Less than $10^{13}$ ions are not enough to achieve required surface modification, and only result in reduced adhesion strength. More than $10^{18}$ ions inefficiently further decompose the modified surface layer. The ion irradiation may be performed by emitting the required number of ions at once or by emitting fewer ions repeatedly until the required total number of ions is emitted. In order to avoid thermal damage to the fluororesin, it is preferable to emit fewer ions in each time and repeat this dose multiple times.

Other than those described above, the structure, shape, size, number, material and the like of the surface modification apparatus 1 as a whole and its components can be appropriately changed without departing from the spirit of the present invention.

EXAMPLES

The following description is offered to specifically illustrate the present invention based on examples. The present invention, however, is not limited only to these examples.

Preparations 1 to 16

Ion beam irradiation was performed on the following fluororesin films under the following common conditions at applied voltages and numbers of irradiations shown in Table 1. Table 1 also shows the results of visual observation on discoloration of the films.

The common conditions of the surface modification are as follows.

(1) Ion irradiation device: product of IZOVAC, IZOVA BEAM CLEANING SYSTEM (anode layer ion source); this ion irradiation device is driven by a driving device available from LANTECHNICAL SERVICE CO., LTD.

(2) Set vacuum: $10^{-2}$ Pa (3) Fluororesin film:

PTFE: product of NIPPON VALQUA INDUSTRIES, LTD., VALFLON (registered trademark), thickness 100 μm Modified PTFE: product of NIPPON VALQUA INDUSTRIES, LTD., New VALFLON EX1 (VALFLON: registered trademark), thickness 100 μm PFA: product of DAIKIN INDUSTRIES, Ltd., Neoflon PFA film (Neoflon: registered trademark), thickness 100 μm ETFE: Asahi Glass Co., Ltd., Fluon ETFE (registered trademark), thickness 100 μm (4) Distance between ion irradiation device and fluororesin film: 100 mm (measured as the distance ("D" in FIG. 4) between the center of the width direction length of the irradiation lateral face 15 ("C" in FIGS. 3 and 4) and the fluororesin film along the direction perpendicular to the motion direction of the ion irradiation device 2)

Process gas: Ar, flow rate 40 sccm, treatment rate 20 mm/sec

TABLE 1

| Preparation | Fluororesin | Applied voltage (kV) | Number of irradiations | Discoloration |
|---|---|---|---|---|
| 1 | PTFE | 0.8 | 1 | Not observed |
| 2 | PTFE | 0.8 | 4 | Not observed |
| 3 | PTFE | 1.0 | 1 | Not observed |
| 4 | PTFE | 1.0 | 4 | Not observed |
| 5 | PTFE | 1.5 | 1 | Not observed |
| 6 | PTFE | 2.5 | 1 | Not observed |
| 7 | PTFE | 3.5 | 1 | Not observed |
| 8 | PTFE | 4.0 | 1 | Observed |
| 9 | Modified PTFE | 2.5 | 1 | Not observed |
| 10 | Modified PTFE | 3.5 | 1 | Not observed |
| 11 | PFA | 1.5 | 1 | Not observed |
| 12 | PFA | 2.5 | 1 | Not observed |
| 13 | PFA | 3.5 | 1 | Observed |
| 14 | ETFE | 1.5 | 1 | Not observed |
| 15 | ETFE | 2.5 | 1 | Not observed |
| 16 | ETFE | 3.5 | 1 | Observed |

Surface discoloration was observed on the PTFE film applied at a voltage of 4.0 kV. Likewise, surface discoloration was observed on the PFA and ETFE films applied at a voltage of 3.5 kV. Based on these results, the upper limit of the voltage to be applied to the PTFE and modified PTFE films was set to 3.5 kV, and the upper limit of the voltage to be applied to the PFA and ETFE films was set to 2.5 kV.

In the examples, the following resins were used as the thermoplastic resin.

Thermoplastic resin: olefin thermoplastic resin (product of Nippon Polychemicals Co., Ltd., "BC6" (trade name))

Styrene elastomer: (product of ARONKASEI CO., LTD., "Elastomer AR-710" (trade name))

Dynamically vulcanized thermoplastic elastomer: (in-house product; prepared as below)

BC6 (40 parts by mass), Esprene 670F (200 parts by mass), Tackirol 250-III (12 parts by mass), and zinc oxide #2 (5 parts by mass) were mixed and kneaded by a twin screw extruder at 200° C. at 200 rpm to prepare the dynamically vulcanized thermoplastic elastomer.

Sea phase: polypropylene "BC6", product of Nippon Polychemicals Co., Ltd.

Cross-linked rubber phase: ethylene propylene diene rubber "Esprene 670F", product of Sumitomo Chemical Co., Ltd.

Crosslinking agent: halogenated alkyl phenol resin "Tackirol 250-III", product of Taoka Chemical Co., Ltd.

Zinc oxide: Zinc oxide #2, product of Mitsui Mining Co., Ltd.

<Melting Point of Thermoplastic Resin>

The melting peak temperature measurement by differential scanning calorimetry (DSC) in accordance with JIS K7121-1987 was performed using DSC 6220 (SII NanoTechnology Inc.) by power compensated differential scanning calorimetry. The mass of each specimen used was about 8 mg, and the temperature was increased at a rate of 10° C./min.

Examples 1 to 25 and Comparative Examples 1 to 3

The films subjected to ion beam irradiation were cut into pieces (100 mm×100 mm in size) for the treatment of bonding to a thermoplastic resin. Separately, the thermoplastic resins were formed into 100 mm×100 mm×2.5 mm sheets by an injection molding machine.

Each pair of the thermoplastic resin and the surface-modified fluororesin film were bonded to each other by a heat press molding machine. A mold having a 100 mm×100 mm×2 mm cavity was set in the heat press molding machine, and a thermoplastic resin sheet and a surface-modified fluororesin film were placed in the mold in such a manner that the modified surface faced the thermoplastic resin sheet. In addition, in order to form a grip tab for peeling strength measurement (described later), an untreated fluororesin film (PTFE film, 40 mm×100 mm×0.1 mm) was inserted between the thermoplastic resin sheet and the surface-modified fluororesin film.

The mold was heated to a predetermined temperature under a pressure of 0.5 MPa. After heated to the predetermined temperature, the mold was further pressurized to a predetermined pressure and maintained for 10 minutes. Then, the mold was cooled while the pressure was maintained. When the mold was cooled to room temperature, the pressure was released and then the sample was taken out of the mold.

<Measurement of Peeling Strength of Thermoplastic Resin/Surface-Modified Fluororesin Film>

The peeling strength was determined as resistance of the obtained composites. The resistance was measured by cutting each composite into a 20-mm width strip, fitting the fluororesin film and the thermoplastic resin at one of the longitudinal ends of the strip, separately in upper and lower chucks, and then raising one of them at a rate of 50 ram/min.

The PTFE film applied at a voltage of 3.5 kV, which had not shown discoloration in the examination in Table 1, was used for bonding to the various thermoplastic resins. The melting peak temperatures of the thermoplastic resins, the set temperatures and pressures during heat pressing, and the peeling strengths are shown in Table 2. It should be noted that "Elastomer AR-710" did not show a clear melting peak temperature and therefore was given 180° C. as its melting peak temperature based on ordinary molding temperatures of 170° C. to 190° C.

TABLE 2

| Example | Thermoplastic resin | Melting peak temperature (° C.) | Set temperature (° C.) | Set pressure (MPa) | Peeling strength (N/mm) |
|---|---|---|---|---|---|
| Comparative Example 1 | Olefin resin | 157 | 140 | 10 | <0.1 |
| Example 1 | Olefin resin | 157 | 180 | 10 | >2.6 |
| Example 2 | Olefin resin | 157 | 220 | 0.1 | 1.1 |
| Example 3 | Olefin resin | 157 | 220 | 1 | >2.6 |
| Example 4 | Olefin resin | 157 | 220 | 10 | >2.6 |
| Comparative Example 2 | Styrene elastomer | (180) | 140 | 10 | 0.27 |
| Example 5 | Styrene elastomer | (180) | 180 | 10 | >2.5 |
| Example 6 | Styrene elastomer | (180) | 220 | 10 | >2.6 |
| Comparative Example 3 | Dynamically vulcanized thermoplastic elastomer | 156 | 140 | 10 | <0.1 |
| Example 7 | Dynamically vulcanized thermoplastic elastomer | 156 | 180 | 10 | >2.5 |
| Example 8 | Dynamically vulcanized thermoplastic elastomer | 156 | 220 | 10 | >2.6 |

The results of Table 2 demonstrated that better peeling strength can be achieved by heating a thermoplastic resin to a temperature of higher than the melting temperature or molding temperature of the thermoplastic resin, and pressure-bonding the thermoplastic resin in a molten state and a surface-modified fluororesin. It was also demonstrated that if the molding pressure is less than 1 MPa, the air may be trapped between the thermoplastic resin and the fluororesin film, thereby resulting in insufficient bonding.

In the table, samples which were not bonded at all and could not be measured were given "<0.1" for the peeling strength. Samples whose fluororesin film was broken were given ">" before the values and the actual peeling strengths thereof should be higher than the values obtained by this test.

Composites of the surface-modified fluororesin films produced in Preparations 1 to 16 and the thermoplastic resins were measured for peeling strength. Table 3 shows the results.

TABLE 3

| Example | Thermoplastic resin | Preparation | Set temperature (° C.) | Set pressure (MPa) | Peeling strength (N/mm) |
|---|---|---|---|---|---|
| Example 9 | Olefin resin | 1 | 220 | 10 | 0.83 |
| Example 10 | Olefin resin | 2 | 220 | 10 | 1.2 |
| Example 11 | Olefin resin | 3 | 220 | 10 | 1.1 |
| Example 12 | Olefin resin | 4 | 220 | 10 | 2.2 |
| Example 13 | Olefin resin | 5 | 220 | 10 | 2.1 |
| Example 14 | Olefin resin | 6 | 220 | 10 | >2.6 |

TABLE 3-continued

| Example | Thermoplastic resin | Preparation | Set temperature (° C.) | Set pressure (MPa) | Peeling strength (N/mm) |
|---|---|---|---|---|---|
| Example 15 | Olefin resin | 7 | 220 | 10 | >2.6 |
| Example 16 | Olefin resin | 9 | 220 | 10 | >2.5 |
| Example 17 | Olefin resin | 10 | 220 | 10 | >2.5 |
| Example 18 | Olefin resin | 11 | 220 | 10 | >1.9 |
| Example 19 | Olefin resin | 12 | 220 | 10 | >1.9 |
| Example 20 | Olefin resin | 14 | 220 | 10 | >2.2 |
| Example 21 | Olefin resin | 15 | 220 | 10 | >2.1 |
| Example 22 | Dynamically vulcanized thermoplastic elastomer | 6 | 220 | 10 | >2.5 |
| Example 23 | Dynamically vulcanized thermoplastic elastomer | 7 | 220 | 10 | >2.6 |
| Example 24 | Dynamically vulcanized thermoplastic elastomer | 9 | 220 | 10 | >2.4 |
| Example 25 | Dynamically vulcanized thermoplastic elastomer | 10 | 220 | 10 | >2.5 |

The results of Table 3 show that the different types of fluororesin films exhibited sufficient peeling strengths. However, the samples subjected to lower voltage application did not have a sufficient peeling strength. In particular, an applied voltage of lower than 1 kV resulted in an insufficient peeling strength even if the irradiation was repeated more times.

In the table, samples which were not bonded at all and could not be measured were given "<0.1" for the peeling strength. Samples whose fluororesin film was broken were given ">" before the values and the actual peeling strengths thereof should be higher than the values obtained by this test.

REFERENCE SIGNS LIST

1 Surface modification apparatus
2 Ion irradiation device
3 Treatment chamber
4 Holding device
5 Antechamber
6 Vacuum device
7 Piston
11 Slit
12 Space
13 Anode
14 Gas flow path
15 Irradiation lateral face
16 Inner pole
17 Outer pole
21 Glass substrate
25 Fore vacuum pump
26 Second vacuum pump
27, 28, 29, 30, 31 Automatic valve
35 Pressing surface
36 Female screw
37 Circumferential surface

The invention claimed is:

1. A method for producing a fluororesin/thermoplastic resin composite, the method comprising:
   roughening a surface of a fluororesin film with anode layer ion beam irradiation from an anode layer ion source to which a voltage of not less than 1.5 kV but not more than 3.5 kV is applied one time; and
   pressure-bonding the surface-modified fluororesin film obtained in the surface roughening step and a thermoplastic resin under a pressure of not less than 1 MPa while maintaining the thermoplastic resin in a fluid state,
   wherein the fluororesin film comprises a fluororesin selected from polytetrafluoroethylene and modified polytetrafluoroethylene,
   wherein the thermoplastic resin is selected from the group consisting of polypropylene resins, cycloolefin resins, styrene resins, olefin elastomers (TPO) which include an olefin resin and uncross-linked rubber phases of an ethylene-propylene polymer, and TPE-V which includes an olefin resin and cross-linked rubber phases of an ethylene propylene diene polymer.

2. The method for producing a composite according to claim 1, wherein the pressure-bonding is performed at a temperature of not lower than a melting point of the thermoplastic resin.

3. The method for producing a composite according to claim 1, wherein the pressure-bonding is performed at a temperature of not lower than a molding temperature of the thermoplastic resin.

4. A method for producing a fluororesin/thermoplastic resin composite, the method comprising:
   roughening a surface of a fluororesin film with an anode layer ion beam irradiation from an ion source to which a voltage of not less than 1.5 kV but not more than 2.5 kV is applied one time; and
   pressure-bonding the surface-modified fluororesin film obtained in the surface roughening step and a thermoplastic resin under a pressure of not less than 1 MPa while maintaining the thermoplastic resin in a fluid state,
   wherein the fluororesin film comprises tetrafluoroethylene-perfluoroalkyl vinyl ether copolymers or ethylene-tetrafluoroethylene copolymers,
   wherein the thermoplastic resin is selected from the group consisting of polypropylene resins, cycloolefin resins, styrene resins, olefin elastomers (TPO) which include an olefin resin and uncross-linked rubber phases of an ethylene-propylene polymer, and TPE-V which includes an olefin resin and
   cross-linked rubber phases of an ethylene propylene diene polymer.

* * * * *